United States Patent [19]

Hetzel et al.

[11] 3,892,879
[45] July 1, 1975

[54] USE OF OXAZOLINE FLAVORING AGENTS AND FLAVOR EXTENDERS

[75] Inventors: Donald S. Hetzel, New London; Anibal Torres, Waterford, both of Conn.

[73] Assignee: Pfizer Inc., New York, N.Y.

[22] Filed: June 29, 1973

[21] Appl. No.: 374,931

Related U.S. Application Data

[60] Division of Ser. No. 150,768, June 7, 1971, Pat. No. 3,769,293, which is a continuation-in-part of Ser. No. 34,876, May 5, 1970, abandoned.

[52] U.S. Cl.................................. 426/536; 426/537
[51] Int. Cl............................................... A23l 1/26
[58] Field of Search............ 426/65, 175; 260/307 F

[56] References Cited
UNITED STATES PATENTS

| | | | |
|---|---|---|---|
| 3,627,540 | 12/1971 | Katz et al............................. | 426/65 |
| 3,666,494 | 5/1972 | Bentz.................................... | 426/65 |
| 3,769,293 | 10/1973 | Hetzel.............................. | 426/65 X |

*Primary Examiner*—Joseph M. Golian
*Attorney, Agent, or Firm*—Connolly and Hutz

[57] ABSTRACT

A series of novel 2,4,5-alkyl-substituted 3-oxazolines and their use as flavoring agents and flavor extenders. The use of 2,5-dialkyl-2-oxazolines as flavoring agents and flavor extenders.

3 Claims, No Drawings

USE OF OXAZOLINE FLAVORING AGENTS AND FLAVOR EXTENDERS

CROSS REFERENCE TO RELATED APPLICATION

The present application is a division of application Ser. No. 150,768 filed June 7, 1971, now U.S. Pat. No. 3,769,293, which in turn is a continuation-in-part of application Ser. No. 34,876 filed May 5, 1970, and now abandoned.

BACKGROUND OF THE INVENTION

This invention relates to a series of novel 2,4,5-alkyl-substituted 3-oxazolines which are useful as flavoring agents and flavor extenders. It further relates to the use of certain known 2,5-dialkyl-2-oxazolines as flavoring agents and flavor extenders.

Artificial flavoring agents and flavor enhancers are widely used today and number in the hundreds. A wide variety of chemical compounds, especially organic compounds, are used for these purposes and include aliphatic and aromatic alcohols, aldehydes, ketones, acids, esters, phenols, and lactones. Certain compounds are known to have a specific kind of taste and aroma comparable in many instances to that of a naturally occurring product. For example, γ-undecalactone, known as "peach aldehyde", is used as an artificial flavoring agent in the manufacture of products having a peach-like flavor. The use of such compounds by flavor technologists provides a means of simulating natural flavors and aromas by solely artificial means.

Other compounds, usually referred to as flavor enhancers or extenders are effective in intensifying the sensory response to flavor materials in a manner analogous to the action of a chemical catalyst, or as augmentors or suppressors of the responses (odor, taste, and mouthfeel) of sensory organs to the stimuli of food. They are effective at low levels and add little or no flavor of their own at these levels. Flavor extenders may be present as normal constituents of a food, or may be produced in the processing. At its inception the definition of flavor extenders or enhancers applied only to products which had this effect without contributing their own distinctive flavors. Today there is a tendency to broaden this definition to include as extenders products which do contribute some flavor. In many cases, the artificial flavor compositions, often including enhancers, are preferred because of their stability, availability, and lower cost.

Artificial flavoring agents and flavor enhancers are widely used in foodstuffs and beverages and in increasing the acceptability of medicines where, for example, they are added to tablet coatings and elixirs.

SUMMARY OF THE INVENTION

This invention comprises novel compounds having the formulae:

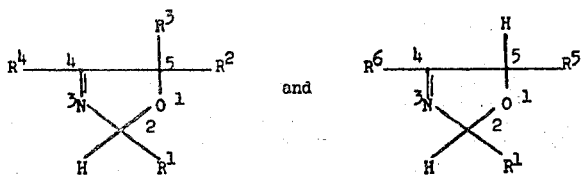

Wherein $R^1$, $R^2$, $R^3$, and $R^4$ are each alkyl groups containing up to 6 carbon atoms, and $R^5$ and $R^6$ are each alkyl groups containing from 2 to 6 carbon atoms.

This invention also comprises a method for flavoring foodstuffs and medicines which comprises incorporating therein one of the novel compounds given above or one of the known compounds of the formulae:

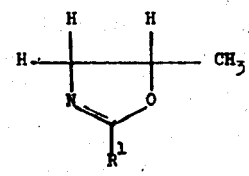

wherein $R^1$ is an alkyl group containing up to 6 carbon atoms.

DETAILED DESCRIPTION OF THE INVENTION

The novel compounds of the present invention are readily prepared by the condensation of the appropriately substituted α-ketol and aldehyde with ammonia in aqueous solution at room temperature. The alkyl substituents at the 4,5-positions of the 3-oxazoline are derived from the α-ketol, while the alkyl moiety of these compounds at the 2-position are derived from the aldehyde. 3-oxazolines containing alkenyl and aryl substituents at the 2-, 4-, and 5-positions can also be prepared by this method using the appropriately substituted precursors. The reaction proceeds quite smoothly and after stirring the reactants at room temperature for several hours the 3-oxazoline is extracted with ether. After drying and evaporating the ether extracts the products can be purified by fractional distillation, generally under vacuum. If desired, they can be purified further by means of gas-liquid chromatography.

The known compounds of this invention are prepared by methods described in the literature (*J. Am. Chem. Soc.* 57:1079, 1935).

The compounds described herein exhibit unique flavor and odor notes which make them useful for flavoring beverages, confections and foodstuffs and imparting desirable notes to perfumes and cosmetics. In addition, it has been found that the herein described compounds are effective as flavor and aroma enhancers for foodstuffs.

We have discovered that the higher homologs of the herein described compounds are significantly more effective as flavor and aroma enhancers than the lower homologs. Accordingly, it has been found that the 2,4,5-trialkyl-3-oxazolines containing methyl groups in the 4- and 5-position are less potent as flavor and aroma enhancers than the higher homologs. The flavor notes of the higher homologs are more intense than the lower homologs and impart a smoother and more desirable aroma and flavor to foodstuffs. Thus, the cocoa-like flavor of 2-isopropyl-4,5-diethyl-3-oxazoline is about five-times more intense than the previously reported 2-isopropyl-4,5-dimethyl-3-oxazoline.

In the case of the known 2,5-dialkyl-2-oxazolines, a 5-methyl substituent does afford preferred products, but in somewhat analogous fashion, extending the carbon chain at the 2-position intensifies flavoring potency. Thus, the strawberry-like flavor and aroma of 2-n-butyl-5-methyl-2-oxazoline is much more intense than the horseradish-like taste and aroma of the 2,5-dimethyl compound.

The 2,4,5,5-tetraalkyl-3-oxazolines also possess valuable flavoring characteristics and impart pleasing flavor notes when added to foodstuffs and the like.

Many of the novel compounds of the present invention have individual and unique flavoring properties. The 2-isopropyl-4,5-diethyl compound has a strong cocoa-like odor and flavor. This compound can be used to prepare artificial cocoa-flavored products and has been used with other additives and compounded with soy proteins and dextrose to give a chocolate drink formulation very similar in appearance, taste and odor to products made with natural chocolate derivatives. Soy proteins are present in soybean oil meal and soybean cake, and because of their availability and low cost they have been advocated as food supplements in areas of the world which suffer from protein deficiencies. Unfortunately, the taste of these crude soy proteins is somewhat unpleasant. It can be seen that the use of 2-isopropyl-4,5-diethyl-3-oxazoline to prepare an acceptable cocoa-tasting protein beverage is potentially of great importance. Indeed, inexpensive, pleasant-tasting high protein beverages are being widely used throughout various parts of the world as a means of providing supplemental amounts of protein in the diet, particularly for children.

This compound can be used as a flavor extender with natural and synthetic cocoa and chocolate bases. By a flavor extender is meant a constituent which either improves the natural flavor, i.e., a flavor enhancer, or when used to replace a portion of a natural flavoring material permits one to still obtain the same overall flavoring effect. Thus, it has been found that addition of up to 5 ppm of 2-isopropyl-4,5-diethyl 3-oxazoline to a commercial cocoa base improves the aroma. We generally prefer to use about 1-100 ppm of the instant compounds for flavoring effects in foodstuffs.

The various other members of the novel series of compounds of the present invention also possess interesting odors. 2-Isopropyl-4,5-di-n-propyl 3-oxazoline has a banana-like odor. While 2-t-butyl-4,5,5-trimethyl 3-oxazoline has a cool minty odor, it has been found that in low concentrations it can be used in preparing synthetic strawberry flavors as well as synthetic banana flavors and butter flavors.

The series of known compounds of this invention also possess interesting flavors and aroma. In addition to the two compounds previously mentioned, 2-ethyl-5-methyl-2-oxazoline has a fruity, melon-like aroma and taste potentially useful in enhancing rum or caramel flavored products such as rum punch beverage or the like. The 2-n-propyl-5-methyl compound has a cool, minty flavor and aroma, and the 2-n-pentyl-5-methyl compound has a fruity, sweet flavor and aroma, both potentially useful in flavoring or enhancing the flavors of a variety of comestibles.

The herein described compounds can also be compounded in various perfume and cosmetic compositions to give a limitless variety of fragrances, the type depending upon the skill and ingenuity of the formulator. Generally a range of from about 1-200 ppm gives the best results. These compounds can also be used in flavoring medicaments, in particular to tablet coatings and in the preparation of elixirs.

The following examples are given to illustrate further the scope of the present invention and are not to be construed as limitations thereof.

EXAMPLE I 11.6 g. (0.10 moles) of propionoin and 7.2 g. (0.10 moles) of isobutyraldehyde are added to 50 ml. of ammonium hydroxide. The reaction mixture is stirred at room temperature for 6 hours. The reaction mixture is extracted several times with diethyl ether, the extracts are combined, and dried over anhydrous sodium sulfate. After filtering and evaporating the ether, the residue is distilled through a short Vigreaux column under reduced pressure. The fraction boiling at 90°–100°C./33 mm is collected to yield 12.4 g. (74%) of 2-isopropyl-4,5-diethyl-3-oxazoline. The pure material has a sharp cocoa-like odor.

The 3-oxazolines listed in the table below are also prepared from the indicated starting materials according to the above procedure.

| Starting Materials | | Product | B.P. °C. | Odor |
| --- | --- | --- | --- | --- |
| Acyloin | Aldehyde | | | |
| $C_2H_5COCHOHC_2H_5$ | $C_2H_5CHO$ | 2,4,5-triethyl-3-oxazoline | 96–104°/33 mm | weedy |
| $C_2H_5COCHOHC_2H_5$ | s—$C_4H_9$-CHO | 2-s-butyl-4,5-diethyl-3-Oxazoline | 109°/15 mm | cocoa |
| n—$C_3H_7$CO-CHOHn$C_3H_7$ | i—$C_3H_7$-CHO | 2-i-propyl-4,5-di-n-propyl-3-oxazoline | 96°/25 mm | cool-banana |
| $CH_3COC(CH_3)OHCH_3$ | i—$C_3H_7$-CHO | 2-i-propyl-4,5,5-trimethyl-3-oxazoline | 70–75°/30 mm | cool menthol; unroasted cocoa |
| $CH_3COC(CH_3)OHCH_3$ | i—$C_4H_9$-CHO | 2-i-butyl-4,5,5-trimethyl-3-oxazoline | 110–113°/30 mm | earthy; diacetyl |
| $CH_3COC(CH_3)OHCH_3$ | t-$C_4H_9$CHO | 2-t-butyl-4,5,5-trimethyl-3-oxazoline | 70°/25 mm | cool-minty |

The compounds listed below are also prepared according to the above procedure.

EXAMPLE II

The organoleptic properties of typical representatives of the compounds of the present invention are illustrated below. The appropriate amounts of the indicated compounds are dissolved in 5% sucrose-in-water solutions and their odor and taste determined.

PRODUCT

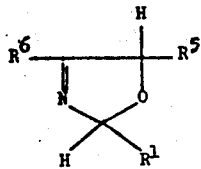

| Acyloin | Aldehyde | $R^1$ | $R^5$ | $R^6$ |
|---|---|---|---|---|
| $n-C_3H_7COCHOHnC_3H_7$ | $CH_3CHO$ | $CH_3$ | $n-C_3H_7$ | $n-C_3H_7$ |
| $n-C_6H_{13}CO-CHOHnC_6H_{13}$ | $C_2H_5CHO$ | $C_2H_5$ | $n-C_6H_{13}$ | $n-C_6H_{13}$ |
| $n-C_4H_9COCHOHnC_4H_9$ | $n-C_3H_7CHO$ | $n-C_3H_7$ | $n-C_4H_9$ | $n-C_4H_9$ |
| $n-C_2H_5COCHOHC_2H_5$ | $n-C_4H_9CHO$ | $n-C_4H_9$ | $C_2H_5$ | $n-C_3H_7$ |
| $n-C_5H_{11}CO-CHOHnC_5H_{11}$ | $n-C_5H_{11}CHO$ | $n-C_5H_{11}$ | $n-C_5H_{11}$ | $n-C_5H_{11}$ |
| $C_2H_5COCHOHC_2H_5$ | $n-C_6H_{13}CHO$ | $n-C_6H_{13}$ | $C_2H_5$ | $C_2H_5$ |
| $C_2H_5COCHOHi-C_3H_7$ | $C_2H_5CHO$ | $C_2H_5$ | $i-C_3H_7$ | $C_2H_5$ |
| $C_2H_5COCHOH-i-C_4H_9$ | $n-C_3H_7CHO$ | $n-C_3H_7$ | $i-C_4H_9$ | $C_2H_5$ |
| $n-C_3H_7COCHOH-t-C_4H_9$ | $i-C_3H_7CHO$ | $i-C_3H_7$ | $t-C_4H_9$ | $n-C_3H_7$ |
| $C_2H_5COCHOH-i-C_5H_{11}$ | $CH_3CHO$ | $CH_3$ | $i-C_5H_{11}$ | $C_2H_5$ |
| $C_2H_5COCHOHC_2H_5$ | $i-C_5H_{11}CHO$ | $i-C_5H_{11}$ | $C_2H_5$ | $C_2H_5$ |
| $C_2H_5COCHOH-i-C_6H_{13}$ | $CH_3CHO$ | $CH_3$ | $i-C_6H_{13}$ | $C_2H_5$ |

STARTING MATERIALS

PRODUCT

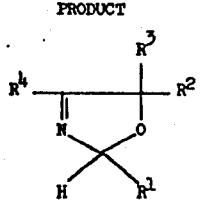

| Acyloin | Aldehyde | $R^1$ | $R^2$ | $R^3$ | $R^4$ |
|---|---|---|---|---|---|
| $C_2H_5COCOH(C_2H_5)_2$ | $C_2H_5CHO$ | $C_2H_5$ | $C_2H_5$ | $C_2H_5$ | $C_2H_5$ |
| $CH_3COCOH(CH_3)_2$ | $n-C_4H_9CHO$ | $n-C_4H_9$ | $CH_3$ | $CH_3$ | $CH_3$ |
| $C_2H_5COCOH(CH_3)_2$ | $n-C_5H_{11}CHO$ | $n-C_5H_{11}$ | $CH_3$ | $CH_3$ | $C_2H_5$ |
| $n-C_3H_7COCOH(CH_3)(C_2H_5)$ | $n-C_6H_{13}CHO$ | $n-C_6H_{13}$ | $CH_3$ | $C_2H_5$ | $n-C_3H_7$ |
| $C_2H_5COCOH(CH_3)-(n-C_6H_{13})$ | $C_2H_5CHO$ | $C_2H_5$ | $n-C_6H_{13}$ | $CH_3,C_2H_5$ | |
| $n-C_6H_{13}COCOH(n-C_3H_7)_2$ | $CH_3CHO$ | $CH_3$ | $n-C_3H_7$ | $n-C_3H_7$ | $n-C_6H_{13}$ |
| $i-C_4H_9COCOH(CH_3)(C_2H_5)$ | $n-C_3H_7CHO$ | $n-C_3H_7$ | $C_2H_5$ | $CH_3$ | $i-C_4H_9$ |
| $i-C_5H_{11}COCOH(CH_3)_2$ | $i-C_3H_7CHO$ | $i-C_3H_7$ | $CH_3$ | $CH_3$ | $i-C_5H_{11}$ |
| $CH_3COCOH(CH_3)(n-C_5H_{11})$ | $CH_3CHO$ | $CH_3$ | $n-C_5H_{11}$ | $CH_3$ | $CH_3$ |
| $C_2H_5COCOH(CH_3)(n-C_4H_9)$ | $t-C_4H_9CHO$ | $t-C_4H_9$ | $n-C_4H_9$ | $CH_3$ | $C_2H_5$ |
| $CH_3COCOH(CH_3)(n-C_4H_9)$ | $i-C_5H_{11}CHO$ | $i-C_5H_{11}$ | $CH_3$ | $n-C_4H_9$ | $CH_3$ |
| $CH_3COCOH(CH_3)(n-C_6H_{13})$ | $CH_3CHO$ | $CH_3$ | $CH_3$ | $n-C_6H_{13}$ | $CH_3$ |
| $CH_3COCOH(C_2H_5)(i-C_5H_{11})$ | $C_2H_5CHO$ | $C_2H_5$ | $C_2H_5$ | $i-C_5H_{11}$ | $CH_3$ |

Relative Flavor Intensity and Flavor Character of Tested Oxazoline Compounds in 5% Sucrose Solutions Concentration of Compounds in Parts per million (ppm)

| Relative Flavor Intensity (Odor and Taste) | Compounds | | | |
|---|---|---|---|---|
| | 2-isopropyl-4,5,5-trimethyl-3-oxazoline | 2-isobutyl-4,5,5-trimethyl-3-oxazoline | 2,4,5-triethyl-3-oxazoline | 2-isopropyl-4,5-diethyl-3-oxazoline |
| Absent | 0.0625 | 50 | Below 0.0625 | Below 0.0625 |
| Threshold | 0.125 | 75 | 0.0625 | 0.0625 |
| Weak | 1 | 100 | — | — |
| Moderate | 5 | — | 1 | 1 |
| Moderate Strong | 10 | — | 5 | 5 |
| Pronounced | 25 | — | 10 | 10 |
| Strong | 50 | — | 25 | 25 |
| Very strong | 75 | — | 50 | 50 |
| Flavor Character (Odor and taste) | Ethereal, dry earthy (fungal) very reminiscent of Jamaica Rum Essence. | Earthy (fungal) with buttery green leafy notes. | Very strong Green-earthy (fungal) very reminiscent of fresh carrots. | Very strong Sweet cocoa like flavor with some mild fungal green like notes |

A 1% solution of 2-isopropyl-4,5-dimethyl-3-oxazoline exhibited a very weak sweet cocoa-like odor and taste with a strong objectionable, weedy, green fungal note, while a 1% solution of 2-isopropyl-4,5-diethyl-3-oxazoline displayed a very strong sweet cocoa-like odor and taste with mild, fungal, green notes.

EXAMPLE III

Comparison of Flavor Intensity and Quality of 2,4,5-Trimethyl-3-Oxazoline with 2-Methyl-4,5-Diethyl-3-Oxazoline An organoleptic evaluation was conducted to compare the flavor (odor and taste) intensity and quality between 2,4,5-trimethyl-3-oxazoline and 2-methyl-4,5-diethyl-3-oxazoline in 5% sugar-aqueous solution. Both test materials were examined at the same concentrations according to the protocol below.

Thirteen samples of the 5% sugar-aqueous solution were prepared comprising six samples containing respectively 1,000, 500, 200, 100, 50 and 25 parts per million (ppm) of 2,4,5-trimethyl-3-oxazoline, six samples containing 2-methyl-4,5-diethyl-3-oxazoline at the same concentration, and one blank sample. The solutions were coded and evaluated by two judges as to relative flavor intensity and quality. The judges were asked to arrange the solution in decreasing order of flavor intensities and to indicate whether they could distinguish flavor quality. The results of this evaluation are outlined below.

The results of the above flavor comparison show the flavor of 2-methyl-4,5-diethyl-3-oxazoline to be stronger than that of 2,4,5-trimethyl-3-oxazoline. Moreover, the results show that the flavor imparted by the 2-methyl-4,5-diethyl-3-oxazoline is different in character than that of 2,4,5-trimethyl-3-oxazoline. The former compound imparted a sweeter, delicate and more appealing flavor than the 2,4,5-trimethyl-3-oxazoline.

EXAMPLE IV

Sensory Evaluation and Comparison of Flavor Intensity and Quality of 2-Isopropyl-4,5-diethyl-3-oxazoline with 2-Isopropyl-4,5-Dimethyl-3-oxazoline The flavor intensity and character of 2-isopropyl-4,5-diethyl-3-oxazoline were evaluated and compared with 2-isopropyl-4,5-dimethyl-3-oxazoline in 5% sucrose-aqueous solution. Two series of test solutions were prepared. Test series I consisted of four samples containing respectively 50, 25, 10 and 1 part per million of 2-isopropyl-4,5-diethyl-3-oxazoline. Test series II consisted of four samples to which was added separately 50, 25, 10, and 1 part per million of 2-isopropyl-4,5-dimethyl-3-oxazoline. The solutions were cooled and evaluated by two judges as to odor and taste (flavor) by arranging them in decreasing order of flavor intensities. At the same time the solutions flavor qualities were also

| Coded Solutions | Compound | Concentration in ppm |
|---|---|---|
| S | 2,4,5-Trimethyl-3-oxazoline | 1,000 |
| P | 2,4,5-Trimethyl-3-oxazoline | 500 |
| N | 2,4,5-Trimethyl-3-oxazoline | 200 |
| A | 2,4,5-Trimethyl-3-oxazoline | 100 |
| K | 2,4,5-Trimethyl-3-oxazoline | 50 |
| D | 2,4,5-Trimethyl-5-oxazoline | 25 |
| B | 2-Methyl-4,5-Diethyl-3-oxazoline | 1,000 |
| J | 2-Methyl-4,5-Diethyl-3-oxazoline | 500 |
| T | 2-Methyl-4,5-Diethyl-3-oxazoline | 200 |
| E | 2-Methyl-4,5-Diethyl-3-oxazoline | 100 |
| R | 2-Methyl-4,5-Diethyl-3-oxazoline | 50 |
| O | 2-Methyl-4,5-Diethyl-3-oxazoline | 25 |
| Z | 5% Sugar Solution | (Control) |

Evaluation I: Order in which judges arranged solution in decreasing order of flavor intensity and quality.

| Judges | Decreasing Order of Flavor Intensities | Judges' Remarks |
|---|---|---|
| 1 | B, S, J, P, T, N, E, A, R, K, Z | "B, J, T, E and R exhibit similar flavor character described as "green-sweet" reminiscent of freshly cut snap beans. S, P, N, A exhibit some flavor but different in character than B, J, T, E and R. The flavor of S, P, N, A was characterized as green-weedy with fungal notes." |
| 2 | B, S, J, P, T, N, E, R, A, K, Z | "B, J, T, E impart a sweeter-green delicate flavor while S, P, N, A exhibited a rougher flavor character." | compared. The results of their sensory flavor evaluation have been outlined below.

| Coded Solution | Compound | Concentration in Parts Per Million |
|---|---|---|
| No. 14 | 2-Isopropyl-4,5-diethyl-3-oxazoline | 50 |
| 26 | 2-Isopropyl-4,5-diethyl-3-oxazoline | 25 |
| 33 | 2-Isopropyl-4,5-diethyl-3-oxazoline | 10 |
| 7 | 2-Isopropyl-4,5-diethyl-3-oxazoline | 1 |
| 4 | 2-Isopropyl-4,5-dimethyl-3-oxazoline | 50 |
| 13 | 2-Isopropyl-4,5-dimethyl-3-oxazoline | 25 |
| 8 | 2-Isopropyl-4,5-dimethyl-3-oxazoline | 10 |
| 5 | 2-Isopropyl-4,5-dimethyl-3-oxazoline | 1 |
| Judges | Decreasing Order of Flavor Intensities | Judges' Remarks |
| 1 | 14, 26, 33 & 4 (comparable), 13, 8, 7, 5 | 14, 26, 33 and 7 exhibit a strong, sweet cocoa-like flavor with mild green-like notes; while 4, 13, 8 and 5 emparted a strong green-fungal weedy-like flavor with weak cocoa notes. |
| 2 | 14, 26, 4, 33, 13, 7, 8, 5 | 14, 26, 33 and 7 exhibit a pronounced sweet cocoa flavor, 4, 13, 8 and 5 impart a different flavor, rougher in character and not as desirable. |

Based on the above results the flavor intensity of 2-isopropyl-4,5-diethyl-3-oxazoline was rated about 5 times more intense than the flavor of 2-isopropyl-4,5-dimethyl-3-oxazoline. The above results also show that 2-isopropyl-4,5-diethyl-3-oxazoline imparted a flavor which was dramatically recognized as strongly sweet cocoa-like while the flavor of the 2-isopropyl-4,5-dimethyl was judged rougher in character possessing a strong green-fungal odor with a less intense cocoa-like flavor.

EXAMPLE V

The chocolate-flavored formulations below are prepared from the indicated ingredients:

| | Chocolate Flavors | |
|---|---|---|
| Ingredients | Flavor Formulation A Weight in Grams | Flavor Formulation B Weight in Grams |
| Vanillin | 3.0 | 3.0 |
| Vanitrope 1% in Propylene Glycol | 3.0 | 3.0 |
| Maltol 4% in Propylene Glycol | 10.0 | 10.0 |
| 2-Isopropyl-4,5-diethyl-3-oxazoline | 0.5 | — |
| Propylene Glycol | 73.5 | 74.0 |
| Cocoa Extract (Anthoine Chiris) | 10.0 | 10.0 |
| | 100.0 | 100.0 |

Organoleptic evaluation of the above formulations is performed by a panel of judges, who compare the aromas and taste of the two flavors in milk drinks. A series of milk samples are prepared with a sufficient amount of beverage formulation A to provide series of samples containing from 1 to 50 parts per million (ppm) of 2-isopropyl-4,5-diethyl-3-oxazoline. Another series of milk samples are prepared using an equivalent amount of formulation B.

In every case it is found that milk samples prepared with flavor formulation A containing the 2-isopropyl-4,5-diethyl-3-oxazoline exhibited an aroma and taste enhancement substantially superior to milk samples prepared from flavor formulation B, which did not contain this compound. In addition, the flavor exhibited by products made with formulation A were more natural and the taste smoother than those made with formulation B.

EXAMPLE VI

A series of samples are prepared by adding from 2 to 100 parts per million of 2-isopropyl-4,5-diethyl-3-oxazoline to chocolate-flavored bakers' products and chocolate-flavored confectionary products (either flavored with natural cocoa powders, cocoa extracts, or those containing natural chocolate products with conventional synthetic flavorants). In all cases a comparable set of control samples are prepared without the 2-isopropyl-4,5-diethyl-3-oxazoline.

It is found that there is an enhancement of flavor when this compound is added. The use of this compound imparts a truer and stronger chocolate flavor.

EXAMPLE VII

2-Isobutyl-4,5,5-trimethyl-3-oxazoline is used, as indicated below, to prepare synthetic strawberry and banana flavor formulations.

| | Synethetic Banana Flavors | |
|---|---|---|
| Ingredients | Flavor Formulation C Weight in Grams | Flavor Formulation D Weight in Grams |
| Ethyl Alcohol 95% U.S.P. | 10.480 | 13.480 |
| Vanillin | 0.370 | 0.370 |
| Orange Oil California U.S.P. | 0.066 | 0.066 |
| Clove Oil Bourbon | 0.333 | 0.333 |
| Propylene Glycol | 26.421 | 26.421 |
| Amyl Acetate | 5.000 | 5.000 |
| Amyl Valerate | 3.330 | 3.330 |
| Acetaldehyde | 1.000 | 1.000 |
| 2-Isobutyl-4,5,5-trimethyl-3-oxazoline | 3.000 | — |
| Totals: | 50.000 | 50.000 |

Synthetic Strawberry Flavors

| Ingredients | Flavor Formulation E Weight in Grams | Flavor Formulation Weight in Grams |
|---|---|---|
| Heliotropine | 0.20 | 0.20 |
| β-Methyl-Naphthyl Ketone | 0.60 | 0.60 |
| Nerolin | 0.04 | 0.04 |
| Diacetyl | 0.80 | 0.80 |
| Methyl Heptine Carbonate 5% in Ethyl Alcohol | 0.20 | 0.20 |
| Dimethyl Anthranitate | 0.20 | 0.20 |
| Geranyl Iso Butyrate | 0.12 | 0.12 |
| Orange Oil California C.P. | 1.44 | 1.44 |
| Ethyl Methyl Phenyl Glycidate | 10.40 | 10.40 |
| Jasmin Absolute 10% in Ethyl Alcohol | 0.12 | 0.12 |
| Rose Moroc Absolute | 0.04 | 0.04 |
| Vanillin | 1.00 | 1.00 |
| Ethyl Maltol | 3.00 | 3.00 |
| Ethyl Butyrate | 2.00 | 2.00 |
| 2-Isobutyl-4,5,5-Trimethyl-3-oxazoline | 2.54 | — |
| Ethyl Alcohol 95% U.S.P. | 27.30 | 31.84 |
| Totals | 50.00 | 50.00 |

The above flavor formulations are used to prepare a series of gelatin desserts. A sufficient amount of flavor formulations C and E are used to provide samples of dessert containing from 2 to 100 parts per million of 2-isobutyl-4,5,5-trimethyl-3-oxazoline. Controls containing flavor formulations D and F are prepared.

The flavor imparted by the compositions containing 2-isobutyl-4,5,5-trimethyl-3-oxazoline exhibited aroma and taste enhancements substantially superior to the controls (formulations D and F). The flavor imparted by the formulation containing the test compound was judged more natural and the taste smoother and mellower, as compared to samples prepared from the controls.

Similar results are obtained when the remaining compounds listed in Example I are used in place of 2-isobutyl-4,5,5-trimethyl-3-oxazoline.

EXAMPLE VIII

Between 2 and 4% by weight of 2-isobutyl-4,5,5-trimethyl-3-oxazoline is blended with the formulation below, sufficient propylene glycol being added to bring total weight of composition to 100 parts.

Butter Flavor

| Ingredients | Parts by Weight |
|---|---|
| Butyric Acid | 4.4 |
| Ethyl Butyrate | 3.2 |
| Amyl Butyrate | 4.3 |
| Diacetyl | 1.1 |
| Benzyl Alcohol | 5.0 |
| Phenoxy Ethyl Isobutyrate | 4.3 |
| 2-isobutyl-4,5,5-trimethyl-3-oxazoline | 2 to 4 |
| propylene glycol    q.s. | 100 |

It is found that butter flavor formulations containing the 2-isobutyl-4,5,5-trimethyl-3-oxazoline exhibit a considerable improvement in aroma and taste as compared to control samples not containing this test compound. Indeed these latter samples have very undesirable harsh notes.

Similar results are obtained when the remaining compounds of Example I are used as additives.

EXAMPLE IX

When 2 to 50 parts per million of 2-isopropyl-4,5-diethyl-3-oxazoline is added to conventional peanut-flavored products (either those containing natural peanut flavors or those containing both natural and synthetic flavors), products having a more desirable delicate flavor are obtained.

Similar results are obtained with the remaining compounds of Example I.

EXAMPLE X

A cocoa-flavored elixir for pharmaceutical purposes is prepared as indicated below:

| | | |
|---|---|---|
| 2-isopropyl-4,5-diethyl-3-oxazoline | 5 | gm. |
| Sucrose | 650 | gm. |
| Liquid Glucose | 200 | gm. |
| Glycerin | 50 | ml. |
| Sodium Chloride | 1 | gm. |
| Vanillin | 0.2 | gm. |
| Sodium Benzoate | 1 | gm. |
| Purified Water, a sufficient quantity to make | 1000 | ml. |

The sucrose and the 2-isopropyl-4,5-diethyl-3-oxazoline are mixed, and to this mixture is gradually added a solution of the liquid glucose, glycerin, sodium chloride, vanillin, and sodium benzoate in 325 ml. of hot purified water. The entire mixture is boiled for 2 minutes and allowed to cool to room temperature. Sufficient purified water is added to make the product measure 1000 ml.

Similar elixirs are prepared by using the other compounds listed in Example I.

EXAMPLE XI

Synthetic strawberry flavors were prepared according to the following formulation, which also contained 2-n-butyl-5-methyl-2-oxazoline at concentration levels of 0 (Control), 0.5%, 1% and 1.5%.

Synthetic Strawberry Flavor

| Ingredients | % by weight |
| --- | --- |
| 3-methyl naphthyl ketone | 0.060 |
| Heliotropin | 0.020 |
| Nerolin | 0.005 |
| Diacetyl | 0.020 |
| Dimethyl anthronilate | 0.020 |
| Raspberry ketone (1-4 hydroxy-phenyl butanone-3) | 0.010 |
| Ethyl methyl phenyl glycidate | 0.500 |
| Vanillin | 0.500 |
| Ethyl meltol | 0.500 |
| Ethyl corproate | 0.040 |
| Butyric acid | 0.050 |
| Ethyl oenawthate | 0.010 |
| Aldehyde $C_{14}$ | 0.010 |
| Cinnamic aldehyde | 0.005 |
| Orris concrete 1:16 tincture | 0.020 |
| Ethyl Alcohol to bring the total weight to 100% | |

Organoleptic evaluations of the resultant flavor blends were carried out by comparing the treated flavor versus the control on perfume smelling blotters and in a sugar-citric acid taste solution. The results of this evaluation revealed that 2-n-butyl-5-methyl-2-oxazoline asserted an enhancement on the aroma and taste at each of the tested levels when compared to the control.

EXAMPLE XII

The flavoring effects of 2-n-butyl-5-methyl-2-oxazoline were evaluated at 0, 0.1 and 0.2% in the preparation of synthetic banana flavors, which were prepared as follows:

Synthetic Banana Flavor

| Ingredients | Flavor I % | Flavor II % | Flavor III % |
| --- | --- | --- | --- |
| Ethyl alcohol | 12.200 | 11.700 | 11.450 |
| Vanillin | 0.370 | 0.370 | 0.370 |
| Orange Oil California | 0.066 | 0.066 | 0.066 |
| Clove Oil Madasgascar | 0.033 | 0.033 | 0.033 |
| Amyl acetate | 5.000 | 5.000 | 5.000 |
| Amyl valerate | 3.330 | 3.300 | 3.300 |
| Acetaldehyde | 2.000 | 2.000 | 2.000 |
| 2-n-butyl-5-methyl-2-oxazoline | — | 0.500 | 0.750 |
| Water | 5.010 | 5.000 | 5.000 |
| Propylene Glycol | 66.335 | 66.335 | 66.335 |
| Total | 100.000 | 100.000 | 100.000 |

The resultant aroma and taste of Flavors II and III were respectively compared to those of Flavor I on smelling blotters and in prepared pudding by sensory panel techniques. Flavors II and III definitely exhibited definite aroma and taste advantage in comparison with Flavor I (Control).

EXAMPLE XIII

The flavoring effects of 2-n-butyl-5-methyl-2-oxazoline were investigated in a variety of edible fruit flavored compositions in comparison with controls. Comparison of the flavor effects disclosed that an improvement of the taste or both odor and taste can be attained by incorporating between 5 and 100 ppm of this oxazoline in these compositions. The following tabulation identifies the flavored food composition and the observations made. The levels specified are those at which 2-n-butyl-5-methyl-2-oxazoline was found to give the most desirable effect.

| Flavored Substance | Level of 2-n-butyl-5-methyl-2-oxazoline ppm | Effects |
| --- | --- | --- |
| Grape juice | 20 – 50 | Gives to juice a more desirable fresh fruit odor and taste. |
| Synthetic grape flavored drink (non-carbonated) | 5 – 15 | Imparted a truer and more intense grapy flavor. |
| Apricot juice | 10 – 25 | Contributed with a desirable fruity taste and odor. |
| Synthetic apricot flavored drink | 15 – 40 | A more preferred fruit flavor was attained. |
| Apple jelly | 5 – 15 | Intensified the natural fruit flavor, odor and taste. |
| Synthetic watermelon flavored drink | 50 – 100 | Accented the flavor, odor and taste. Moreover, it gave a truer and more natural flavor character. |

EXAMPLE XIV

Beneficial, enhancing effects may be achieved by incorporating 25–100 ppm of the 2-n-butyl-5-methyl-2-oxazoline in perfumed substances including shaving lotions, hand cream, toilet water, perfume extracts, soap, detergents and room deodorizer.

EXAMPLE XV

Filter blend tobacco treated with 0, 500 and 2,500 ppm of the 2-n-butyl-5-methyl-2-oxazoline was used to prepare cigarettes. The resultant products were evaluated by experienced cigarette smokers. The consensus of the judges was that the tobacco containing 500 and 2,500 ppm of the 2-n-butyl-5-methyl-2-oxazoline exhibited significant improvement in the odor and taste of the tobacco. The untreated control sample was judged to give a harsh, drier and more pronounced long-lasting after-taste (bitter), while the treated samples exhibited a milder and more desirable tobacco odor and taste with a less intense after-taste.

EXAMPLE XVI

Synthetic apple flavor concentrates containing 2-n-pentyl-5-methyl-2-oxazoline were formulated together with other aromatic chemicals used in apple flavors. A negative control formulated apple flavor was used for comparative tests. Test results rendered that the incorporation of 1% to 5% of the 2-n-pentyl-5-methyl-2-oxazoline to the apple flavor concentrate exhibited a more desirable and intense apple flavor than the untreated control.

EXAMPLE XVII

The procedure described in Example I was repeated using a synthetic pineapple flavor concentrate in place of the apple with similar results.

EXAMPLE XVIII 2-n-propyl-5-methyl-2-oxazoline at concentrations of 2–5% by weight enhances the mint type flavor for dental hygiene products. A blend of clove oil, anethole, menthol, lemon oil, peppermint oil, spearmint oil, 2-n-propyl-5-methyl-2-oxazoline and solvent exhibits a more delicate and preferred flavor when compared with a similar blend which contains no 2-n-propyl-5-methyl-2-oxazoline.

EXAMPLE XIX

Two synthetic rum flavors (so-called Rum Punch) were prepared according to the following prototype formulations:

| Imitation Rum Flavor | I | II |
| --- | --- | --- |
| Acetaldehyde | 20.00 | 20.00 |
| Oil Cognac green | 2.80 | 2.80 |
| Ethyl butyrate | 3.00 | 3.00 |
| Ethyl isovalerate | 3.00 | 3.00 |
| Acetic acid | 6.00 | 6.00 |
| Oil lemon cold press | 4.00 | 4.00 |
| Rose oil Moroc (1% solution in ethyl alcohol) | 2.00 | 2.00 |
| Vanillin | 3.00 | 3.00 |
| Oil of Cassia redistilled | 0.72 | 0.72 |
| Oil of Cloves USP | 0.72 | 0.72 |
| Ethyl oxyhydrate | 38.40 | 38.40 |
| Ethyl alcohol | 16.36 | 3.00 |
| 2-ethyl-5-methyl-2-oxazoline | — | 13.36 |
| Total | 100.00 | 100.00 |

The above flavors were used at 0.5% to flavor cake dough. The resulting baked products were organoleptically evaluated for flavor similarity and flavor preference. Results of this test showed that Flavor II (containing 2-ethyl-5-methyl-2-oxazoline) were rated to give a more outstanding and preferred flavor than Flavor I.

EXAMPLE XX

The procedure outlined in Example XIX is reproduced but using a caramel flavor instead of the rum flavor with similar results.

EXAMPLE XXI

The following perfume composition is prepared according to accepted procedures:

| Ingredients | Weight in Grams |
| --- | --- |
| Rose Oil Bulgarian | 0.10 |
| Ionone Alpha White | 0.05 |
| Vanillin | 0.50 |
| Ylang Ylang Oil | 1.01 |
| Phenyl ethyl Acetate | 0.74 |
| Clary Sage Oil (French) | 1.00 |
| 2-N-butyl-5-Methyl-2-Oxazoline | 1.00 |
| Cade Oil | 0.04 |
| Phenyl Acetic Acid | 0.10 |
| Oakmoss Absolute Colorless (Yugoslavia) | 0.40 |
| Phenyl ethyl alcohol | 5.06 |
| Diethyl phthalate | 10.00 |
| Total | 20.00 |

The above formulation may be used to perfume talcum powder at a level of from about 0.25 to 0.5% by weight.

EXAMPLE XXII

The following perfume composition is prepared according to accepted procedures:

| Ingredients | Weight in Grams |
| --- | --- |
| Ylang Ylang Oil | 0.10 |
| Oil patchuli | 0.15 |
| Oil Sandalwood | 0.15 |
| Musk Xylol | 0.05 |
| Yara Yara | 0.10 |
| Cinnamic Aldehyde | 0.30 |
| Iso-eugenol | 0.10 |
| Coumarin | 0.50 |
| Nutmeg Oil East Indian | 0.15 |
| Orange Oil terpenless | 1.00 |
| Bergamot Oil | 1.00 |
| Geraniol | 1.20 |
| Benzyl Acetate | 1.30 |
| 2-N-butyl-5-Methyl-2-Oxazoline | 0.50 |
| Terpinyl Acetate | 1.10 |
| Terpineol Prime No. 1 | 2.30 |
| Total | 10.00 |

The above formulation may be used to perfume soap at a concentration of from about 0.25 to 0.4% by weight.

EXAMPLE XXIII

The following perfume composition is prepared according to accepted procedures:

| Ingredients | Weight in Grams |
| --- | --- |
| Methyl Anthranilate | 0.20 |
| Yara Yara | 0.20 |
| Para-cresyl Acetate | 0.80 |
| Citronellyl Acetate | 1.60 |
| Turkish Rose Oil | 0.30 |
| Geranyl Acetate | 1.90 |
| 2-N-butyl-5-methyl-2-oxazoline | 3.00 |
| Indol | 1.50 |
| Benzyl Benzoate | 2.00 |
| Geranyl Acetate | 1.70 |
| Benzyl Formate | 2.80 |
| Ylang Ylang Oil | 3.00 |
| Lina Lyl Acetate | 4.00 |
| Citronellol | 4.50 |
| Jasmin Absolute | 8.30 |
| Benzyl Acetate | 42.00 |
| Linalool (Ex Bois de Rose) | 25.20 |
| Diethyl Phthalate | 97.00 |
| Total | 200.00 |

The above formulation may be employed as a jasmine scent in cologne at a concentration of about 0.5% by weight.

EXAMPLE XXIV

The following perfume composition is prepared according to accepted procedures:

| Ingredients | Weight in Grams |
|---|---|
| Rose Moroc Oil | 10.00 |
| Violet Flower Absolute | 5.00 |
| Cassia Oil | 5.00 |
| Orange Flower Oil | 5.00 |
| Tuberose Absolute | 5.00 |
| Orris Concrete | 1.00 |
| Oil Clary Sage | 5.00 |
| Oakmoss Absolute Decolorized | 10.00 |
| Sassafrass Oil | 12.00 |
| Sandalwood Oil | 5.00 |
| Bergamot Oil | 10.00 |
| Bois de Rose | 2.00 |
| Clove Oil | 1.00 |
| Cinnamon Bark Oil (Ceylon) | 1.00 |
| Anise seed Oil | 0.10 |
| Ambrettle seed Concrete | 10.00 |
| Synthetic Rose Oil | 10.00 |
| Vanillin | 10.00 |
| Coumarin | 5.00 |
| Beta-ionone | 5.00 |
| Exaltolide Musk (Firmenich Co) | 6.00 |
| 2-N-butyl-5-methyl-2-oxazoline | 1.90 |
| Total | 125.00 |

The above formulation may be used as a perfume extract at a concentration of about 1%.

What I claim is:

1. A method of flavoring a food base carrying a flavor selected from the group consisting of peanut, cocoa, chocolate, caramel, mint, butter, rum and fruit, said method comprising adding to said base a compound selected from the group consisting of those having the formulae:

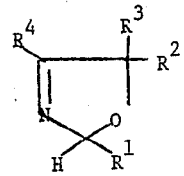 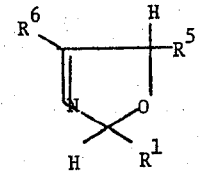

wherein:

$R^1$, $R^2$, $R^3$ and $R^4$ are each alkyl groups containing up to 6 carbon atoms; and $R^5$ and $R^6$ are each alkyl groups containing from 2 to 6 carbon atoms in an amount sufficient to enhance the flavor and aroma of said food base.

2. The method of claim 1 wherein said compound is 2-isopropyl-4,5-diethyl-3-oxazoline.

3. A method of flavoring a chocolate-flavored base which comprises adding to said base 2-isopropyl-4,5-diethyl-3-oxazoline in an amount sufficient to enhance the flavor and aroma of chocolate.

* * * * *